United States Patent [19]

Hirota

[11] Patent Number: 5,257,120
[45] Date of Patent: Oct. 26, 1993

[54] IMAGE PROCESSING APPARATUS

[75] Inventor: Yoshihiko Hirota, Osaka, Japan

[73] Assignee: Minolta Camera Kabushiki Kaisha, Osaka, Japan

[21] Appl. No.: 453,976

[22] Filed: Dec. 20, 1989

[30] Foreign Application Priority Data

| Dec. 22, 1988 | [JP] | Japan | 63-324267 |
| Dec. 22, 1988 | [JP] | Japan | 63-324268 |
| Dec. 22, 1988 | [JP] | Japan | 63-324269 |
| Dec. 22, 1988 | [JP] | Japan | 63-324270 |
| Dec. 22, 1988 | [JP] | Japan | 63-324271 |

[51] Int. Cl.$^5$ ............. H04N 1/40; H04N 1/393; H04N 1/36
[52] U.S. Cl. .................. 358/443; 358/451; 358/460; 358/409
[58] Field of Search ............. 358/400, 401, 403, 408, 358/409, 412, 434, 443, 448, 451, 452, 453, 460; 382/46

[56] References Cited

U.S. PATENT DOCUMENTS

| 3,967,243 | 6/1976 | Kawa | 382/46 |
| 4,422,102 | 12/1983 | Tamura | 358/302 |
| 4,679,096 | 7/1987 | Nagashima | 358/451 |
| 4,760,466 | 7/1988 | Nakamura | 358/294 |
| 4,807,044 | 2/1989 | Kikuchi et al. | 358/448 |
| 4,893,194 | 1/1990 | Sakata | 358/443 |

Primary Examiner—Edward L. Coles, Sr.
Assistant Examiner—Thomas D. Lee
Attorney, Agent, or Firm—Burns, Doane, Swecker & Mathis

[57] ABSTRACT

An image processing apparatus reading images by relatively moving linear CCDs in a subscanning direction on the original images includes a clock generation circuit for generating first and second clock signals having different pulse numbers per unit time, and first and second image memories alternately writing line by line the read image data, one of which carries out writing operation while the other carries out reading operation of the written image data. Writing address of the first and second image memory is designated by a first clock signal, and a reading address of the first and second image memory is designated by a second clock signal. When the image data is stored with low frequency clock signal and the image data are read in accordance with a high frequency clock signal, a reduced image can be formed.

3 Claims, 8 Drawing Sheets

SCANNING DIRECTION (SUBSCANNING DIRECTION)

FIG.6

| NAME | ODD LINE PROCESSING | EVEN LINE PROCESSING |
|---|---|---|
| ODD·LINE | L | H |
| EVEN·LINE | H | L |
| ADDRESS SELECTOR 405 | SELECT WA | SELECT RA |
| ADDRESS SELECTOR 406 | SELECT RA | SELECT WA |
| RAM 401 | WRITING OPERATION | READ-OUT OPERATION |
| RAM 402 | READ-OUT OPERATION | WRITING OPERATION |
| BUFFER 408, 411 | ACTIVE | INACTIVE |
| BUFFER 409, 410 | INACTIVE | ACTIVE |

IMAGE PROCESSING APPARATUS

BACKGROUND OF THE INVENTION

1. Field of the Invention

The present invention relates to an image processing apparatus and, more specifically to an image processing apparatus for forming edited images which are provided by entirely or partially transforming the original images.

2. Description of the Related Art

Recently, image forming apparatuses such as digital copying machines, facsimiles, printer apparatuses having image processing apparatuses digitally processing image signals have various image editing functions other than expansion and reduction of images and such apparatuses have superior reproductivity of gradation and colors of the images.

The image editing functions include expansion and reduction of original images as well as formation of images provided by transforming the original images into desired shapes. Images edited by such function include moved images in which the arrangement of the images are changed, mirror images in which the original images are inverted in line symmetry, inclined images in which the original images are inclined which are suitable for making design of letters, repeated images in which a part of the original image is formed repeatedly, and so on.

The moved images are formed when the image is to be formed on a sheet of paper which is larger than the sheet of paper on which the original image is formed, in order to align the center of the image with the center of the sheet of paper, for instance. The mirror images are formed when printing plates are formed, for example, the inclined images are used for lettering, and the repeated images are used when a large number of labels are to be formed.

When these edited images are to be formed, generally image data of a predetermined amount are once stored in an image memory, and the data in the image memory are rearranged based on arithmetic operations by an arithmetic unit such as a microprocessor and the like.

As disclosed in, for example, Japanese Patent Laying Open No. 59-70358, when images are to be expanded or reduced, a pair of image memory each capable of storing the prescribed amount of image data are provided. Data transfer is carried out between these two image memories, and reduced image data signals or expanded image data signals are generated by changing address designation timing between the memory storing the images to be transmitted and the memory storing the received images at the time of data transfer.

When image processing for forming edited images is carried out by utilizing a software by using a microprocessor and the like, the degree of freedom in edition can be enhanced. However, actually a prescribed processing time is required, as the speed of arithmetic processing is limited. Consequently, real time image formation cannot be carried out. When a plurality of different image editing processes are carried out by sharing one image memory in order to simplify the structure, the software becomes complicated, further reducing the speed of processing.

When expansion or reduction of an image is to be carried out on real time, image data should be taken independent from and parallel to the image processing of the prescribed amount of image data, so that at least two image memories are needed. Therefore, when expansion or reduction of an image is to be carried out by data transfer between a pair of image memories as in the conventional image processing apparatus, four image memories in total are necessary, which increases the size of the image processing apparatus.

SUMMARY OF THE INVENTION

Therefore, one object of the present invention is to carry out various image editing processes with small capacity of image memories, in an image processing apparatus.

Another object of the present invention is to form expanded or reduced images at arbitrary positions in an image processing apparatus.

A further object of the present invention is to carry out image processing at high speed in an image processing apparatus.

A still further object of the present invention is to carry out image processing for forming moved images at high speed in an image processing apparatus.

A still further object of the present invention is to carry out image processing for forming repeated images by a simple structure at high speed in an image processing apparatus.

A still further object of the present invention is to carry out image processing for forming mirror images at high speed in an image processing apparatus.

The above described objects of the present invention can be attained by an image processing apparatus of the present invention which reads original images by relatively moving a plurality of image reading elements arranged in one dimension in a direction intersecting the directions of arrangement of the elements and outputs the read image data to a printer, comprising: first and second memories for storing image data of at least 1 line in the direction of arrangement of the elements; a clock generator for outputting writing clock signals and reading clock signals; a write address counter for generating write address for writing the image data into the first or second memory in accordance with the writing clock signals; a reading address counter for generating reading address for reading the image data from the first or second memory in accordance with the reading clock signals; a synchronized signal generator for generating a signal synchronized with the line by line reading of the image; a controller for controlling the first memory and the second memory such that one memory carries out writing operation in accordance with the writing address while the other carries out reading operation in accordance with the reading address; a switching apparatus for switching the writing operation and the reading operation of the first and second memories in accordance with the synchronized signal; and a changing apparatus for making different the generated address from the writing address counter from the address from the reading address counter.

Since the image processing apparatus of the present invention comprises the above described components, various edition image data signals are generated by changing the initial values of the writing and reading address counters designating the addresses of the first and second memories or by changing the counting operation. Consequently, an image processing apparatus can be provided in which a plurality of image editing processes can be carried out with small capacity of image memories.

Preferably, the changing apparatus includes a clock signal changing apparatus for making different the frequency of the writing clock signal from that of the reading clock signal.

Preferably, the image processing apparatus comprises the above described components. Therefore, reduced images can be formed by storing image data in the first memory in accordance with low frequency clock signals in writing and by reading the same at high frequency, and expanded images can be formed by writing data in accordance with high frequency clock signals in writing and by reading the same in accordance with low frequency clock signals. Consequently, an image processing apparatus can be provided in which images of an arbitrary magnification rate can be formed with image memory having small capacity.

In another aspect of the present invention, the changing apparatus includes an apparatus for changing at least one of a first initial address generated from the writing address counter and a second initial address generated from the reading address counter.

In this aspect of the present invention, the image processing apparatus comprises the above described components. Therefore, a position at which image data output is started can be arbitrarily changed. Therefore, an image processing apparatus capable of carrying image processing for forming moved images at high speed can be provided.

In a further aspect of the present invention, the changing apparatus includes an initial address changing apparatus for changing the initial address generated from the writing address counter or from the reading address counter, and an address count order switching apparatus for switching the order of address generation from the writing address counter or the reading address counter between the incrementing order and decrementing order.

Since the image processing apparatus comprises the above described components in the further aspect of the present invention, the order of output of the image data is inverted from that of input. Consequently, an image processing apparatus capable of carrying out image processing for forming mirror images at high speed can be provided.

More preferably, the changing apparatus includes an initial address changing means for changing at least one initial address from the writing address generating apparatus and the reading address generating apparatus, and the initial address is changed at every prescribed lines.

Since the image processing apparatus comprises the above described component, the position of output of the image data is changed in every line. Consequently, an image processing apparatus capable of carrying out image processing for forming inclined images at high speed can be provided.

In a still further aspect of the present invention, the changing apparatus includes reading address resetting apparatus for resetting the value of reading address generated from the reading address counter at an address value already read during reading of image data from the fist and second memory means.

Since the image processing apparatus comprises the above described component in the further aspect of the present invention, the image data stored in the memory are repeatedly outputted. Consequently, an image processing apparatus capable of carrying out image processing for forming repeated images in a simple structure can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 shows states of signals in various processes in the edition processing circuit shown in FIG. 5;

DESCRIPTION OF THE PREFERRED EMBODIMENTS

Figure 1:
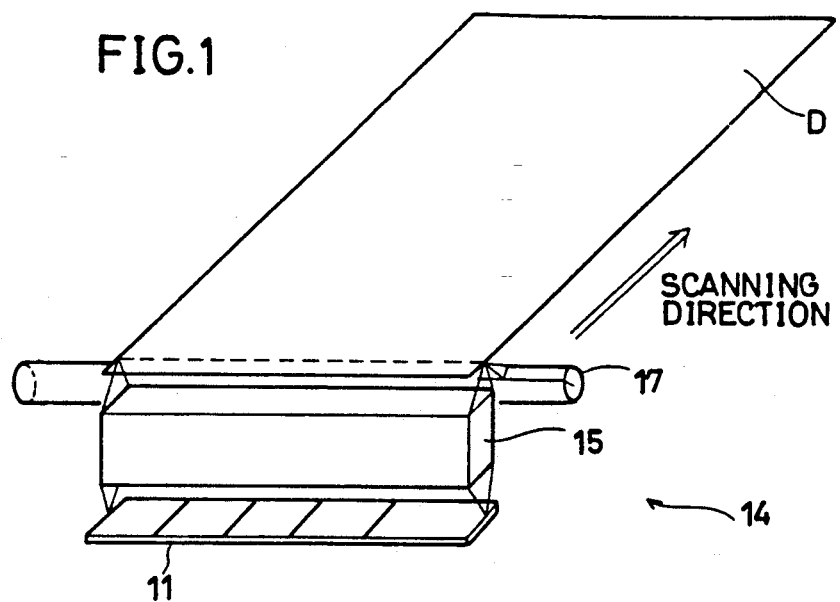
FIG. 1 is a perspective view showing an image reader unit in accordance with the present invention.

One embodiment of the present invention will be described in the following with reference to FIG. 1.

A digital copying machine to which the present invention is applied comprises an image processing apparatus B (see FIG. 4) which carries out various signal processing on pixel signals read by scanning original images to output the same as image signals, and a laser printer portion, not shown, forming color images by known electrophotography based on the image signals transmitted from the image processing apparatus B.

An image reader unit 14 having an image sensor 11 line-scans an original D placed on a platen glass 18 in a subscanning direction.

Figure 2:
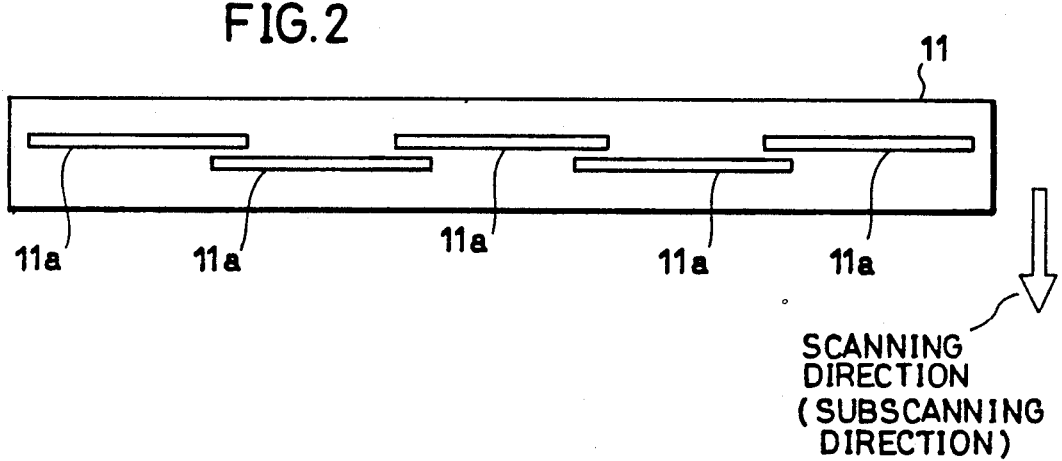
FIG. 2 is a plan view of an image sensor in accordance with the present invention.

As shown in FIG. 2, five contact type CCD sensor chips 11a, 11a . . . are arranged successively in a lateral direction (main scanning direction) and spaced apart from each other alternately by prescribed distance in a staggered manner in the vertical direction (subscanning direction).

Since there is a prescribed space in the subscanning direction, there is a delay in the output signals from the succeeding CCD sensor chip 11a in the subscanning direction. However, this delay can be compensated by delaying the output signal from the preceding CCD sensor chip 11a.

Figure 3:
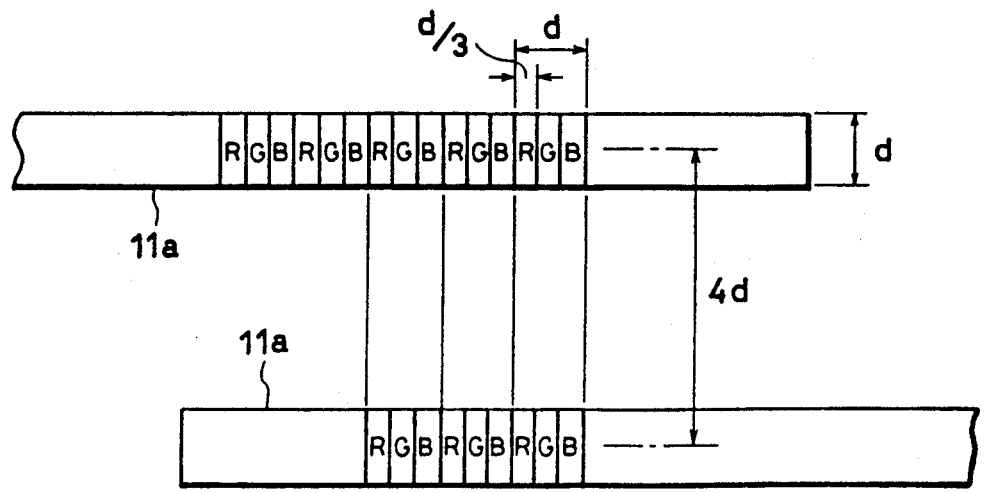
FIG. 3 is an enlarged view of the image sensor shown in FIG. 2.

As shown in FIG. 3, each CCD sensor chip 11a comprises an array of a number of elements each having the dimension of 62.5 μm (d=1/16 mm).

Each element is divided into three sections and filters are provided in each element such that one divided section receives the light of one of the primary colors, (that is, R (red), G (green) and B (blue).

Figure 4:
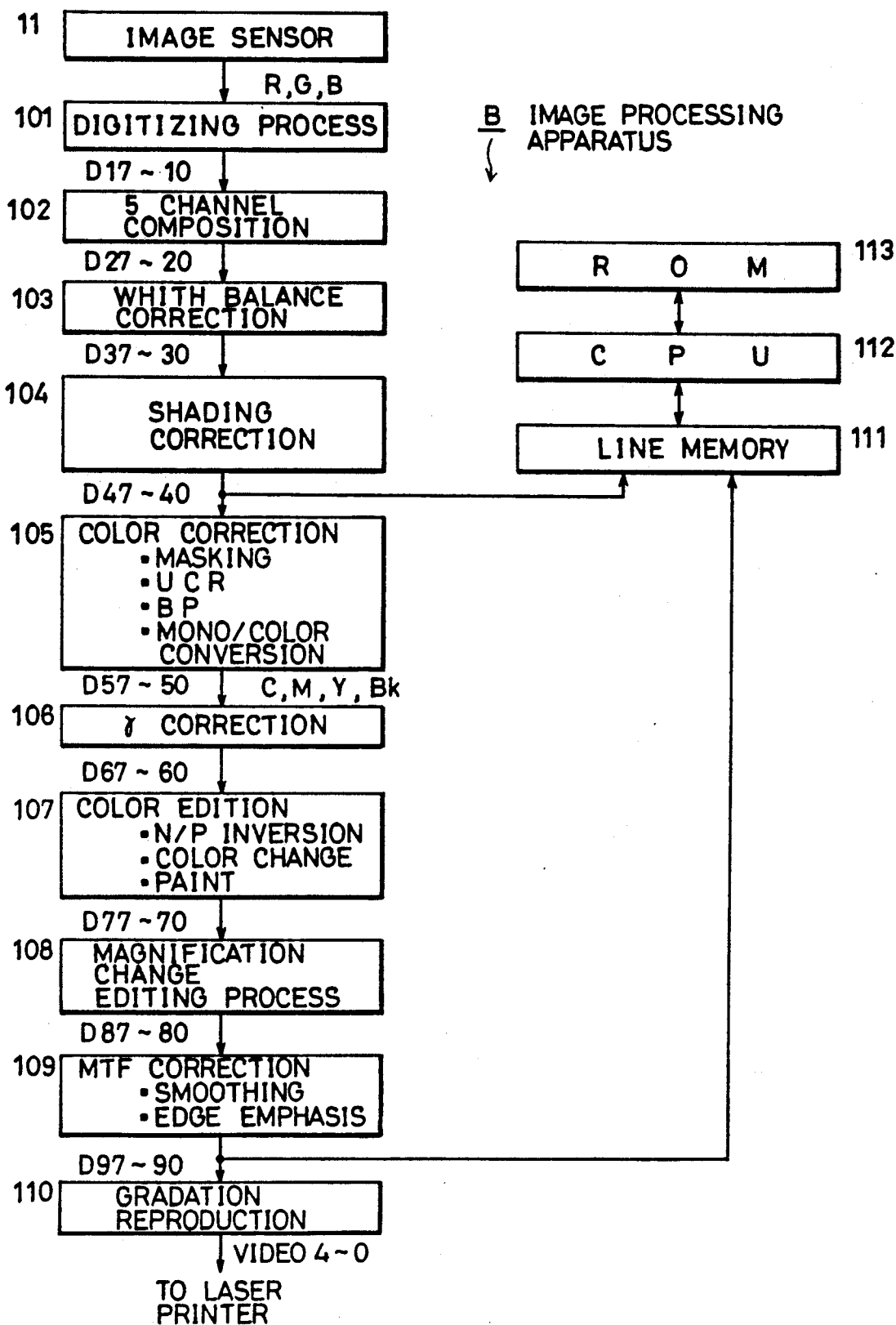
FIG. 4 is a block diagram of electric circuits in the image processing apparatus in accordance with the represent invention.

Referring to FIG. 4, the electric circuit of the image processing apparatus B will be described.

Photoelectric conversion signals which are image signals outputted in parallel from the CCD sensor chip 11a are quantized by a digitizing process circuit 101 including an AD converter, converted into image data of 8 bits (256 pounds), and thereafter they are converted into serial signals corresponding to the arrangement of pixels in a 5 channel composing circuit 102.

Thereafter, white balance correction for compensating the difference among spectral sensitivity of the CCD sensor chips for respective colors, that is, R, G and B is carried out in a white balance correcting circuit 103, and correction corresponding to the light intensity distribution (unevenness of the light intensity) in the main scanning direction of the exposure lamp and to the sensitivity difference among CCD sensor chips is carried out in a shading correction circuit 104. At the same time, the image signals which were the data signals in proportion to the intensity of the reflected light are converted into density data signals in proportion to the density of the original in accordance with the range of reading of the original.

In a color correction circuit 105, masking process for generating image data corresponding to three primary colors of printing toner, that is, Y, M and C from the image data corresponding to the density of the R, G and B as described above, and UCR (Under Color Removal) process for generating image data corresponding to Bk (black) are carried out. Correction based on the background color and the density gradient of the original D is carried out in a γ correction circuit 106.

In a color edition circuit 107, three different processes for color image edition, that is, negative/positive inversion, color change and painting are carried out.

The image data signals D77 to 70 subjected to these various signal processing are thereafter subjected to variable changing process by skipping or interpolation and to various editing processes for forming moved images, mirror images, inclined images or repeated images, in an editing processing circuit 108. The editing process comprises processes for changing the output timing of the image data, the change of output order, changing of scanning speed in the subscanning direction and so on.

Thereafter, smoothing for preventing generation of moire patterns and exaggeration of edges to prevent the edges from becoming dim are carried out in an MTF (Modulation Transfer Function) correcting circuit 109, and the data are binary converted by area gradation method in a gradation reproducing circuit 110 to be transmitted to the laser printer portion. In the laser printer portion, image formation is carried out based on the image signals by beam deflection corresponding to the scanning in the main scanning direction of the original and by the control of rotation of the photoreceptor drum corresponding to the scanning in the subscanning direction.

A line memory 111 storing image data of a specified processing stage is connected to the MTF correcting circuit 109 and to the shading correcting circuit. The line memory 111 is also connected to a CPU (Central Processing Unit) 112 controlling various circuits based on various input signals from operation keys designating the magnification rate, edited images and the like and from various sensors detecting the size of the original, the size of the copy paper, and so on. A ROM 113 storing control program and various data is also connected to the CPU 112.

Figure 5:
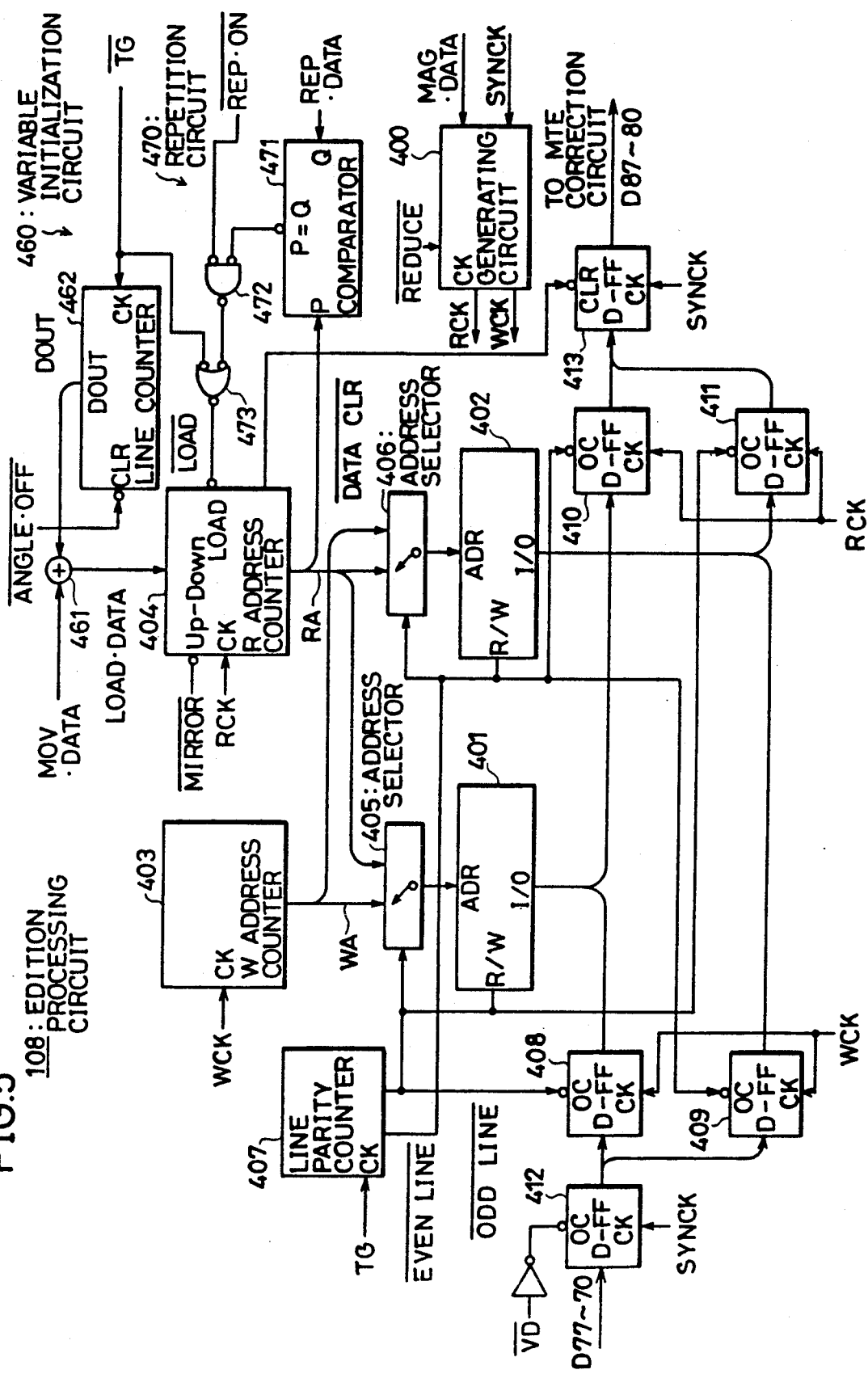
FIG. 5 is an edition processing circuit in the image processing apparatus in accordance with the present invention.

Referring to FIG. 5, the edition processing circuit 108 will be described.

The edition processing circuit 108 carries out magnification changing process and editing process of the image data signals D77 to 70 (8 bits of parallel signals) inputted from the color edition circuit 107 in the preceding stage and outputs the same as image data signals D87 to 80 (8 bits of parallel signals) to the MTF correcting circuit 109 in the succeeding stage. The input and output of the image data are carried out through latch circuits 412 and 413 carrying out latching operation in accordance with the image clock signal SYNCK which is the reference of the transmission timing of the image data between the above mentioned various image processing circuits.

The edition processing circuit 108 comprises a clock generating circuit 400 which outputs writing clock signals WCK and the reading clock signals RCK simultaneously, that is, in parallel; a set of RAMs 401 and 402 alternately writing successively inputted image data by every 1 line period and carrying out writing operation while the other is carrying out reading of the written image data; a writing address counter 403 for designating addresses of writing of the RAMs 401 and 402 in accordance with the writing clock signals WCK; a reading address counter 404 for designating addresses of reading of the RAMs 401 and 402 in accordance with the reading clock signals RCK; address selectors 405 and 406 selecting the writing address WA from the writing address counter 403 and the reading address RA from the reading address counter 404; and a line parity counter 407 for selecting the reading operation or writing operation of the RAMs 401 and 402.

Each of the RAMs 401 and 402 has a capacity of 8 K byte and is capable of storing image data of 1 line (8000 pixels) in the main scanning direction. In the RAMs 401 and 402 writing and reading of the data are carried out through a common input/output port. Therefore, in order to avoid conflict between the input and output data, buffers 408 and 410 formed of D-flipflops (D-FF) are provided for the RAM 401, while buffers 409 and 411 are provided for the RAM 402. Namely, the image memory structure has a so-called double buffer structure. The buffers 408 and 410 and the buffers 409 and 411 carry out latching operation in synchronization with the access to the RAM 401 and RAM 402, respectively.

The writing address counter 403 of this embodiment carries out "1" by "1" incrementing, that is, up counting operation in accordance with the signal WKC, starting from a fixed count initial value (address initial value) in every line. Meanwhile, the reading address counter 404 has its address generating operation controlled by various edition processing signals, as will be described later.

A line parity counter 407 outputs an odd line enable signal $\overline{\text{ODD·LINE}}$ in which "L" and "H" appear alternately every time a horizontal synchronizing signal TG defining 1 line period is counted, and an even line enable signal $\overline{\text{EVEN·LINE}}$ which is an inverted signal of $\overline{\text{ODD·LINE}}$ to select the writing operation or the reading operation of the RAMs 401 and 402. FIG. 6 shows the switching of the RAMs 401 and 402, the address selectors 405 and 406, and of the buffers 408 to 411 based on the signals $\overline{\text{ODD·LINE}}$ and $\overline{\text{EVEN·LINE}}$.

Figure 7:
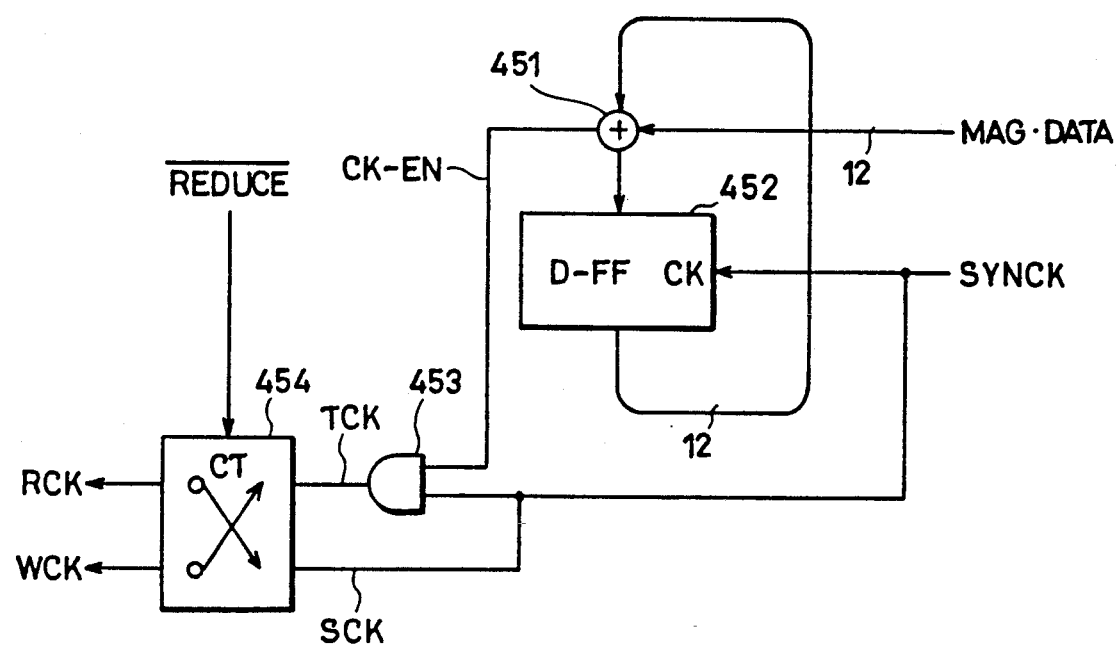
FIG. 7 is a block diagram of a clock generating circuit in accordance with the present invention.

Referring to FIG. 7, the clock generating circuit 400 will be described.

The image clock signal SYNCK which serves as a reference for the transmission timing of image data between the above described various image processing circuits is regarded as a standard clock signal SCK. The clock generating circuit 400 skips the standard clock signal SCK by means of an adder 451 to generate a clock signal TCK.

Magnification data (MAG·DATA) determined dependent on the magnification rate are applied from the CPU 112 to the adder 451, the adder 451 adds the output data from the latch circuit 452 to the MAG·DATA, and the data of the sum are latched in the latch circuit 452. This adding operation is repeated at every pulse of the signal SYNCK, and a carry signal CK-EN at the addition is inputted to a gate circuit 453. The signal SYNCK is also inputted to the gate circuit 453.

Unless the sum data incremented by MAG·DATA exceed the maximum value of the adder 451 which is to be decided by the bit number of the adder, the signal CK-EN is at the "L" level and the output from the gate circuit 453 is also at the "L" level. Consequently, pulses of the signal SYNCK is eliminated at every prescribed number, thereby generating the clock signal TCK provided by skipping the signal SYNCK. Naturally, when the magnification rate is 1, that is, when images of the equal scale are to be formed, the signal SYNCK is not skipped, and the transfer timing of the clock signal TCK is the same as that of the standard clock signal SCK.

The clock signal TCK generated in this manner is added to the selector 454 together with the signal SYNCK as the standard clock signal SCK.

The selector 454 selects either the standard clock signal SCK or the clock signal TCK as the writing clock signal WCK and selects the remaining one as the reading clock signal RCK to output the same.

The selecting operation of the selector 454 is controlled by a magnification control enable control $\overline{\text{REDUCE}}$.

Namely, when reduced images are to be formed, the signal $\overline{\text{REDUCE}}$ is at the "L" level, at which time the selector 454 selects the clock signal TCK as the writing clock signal WCK and, at the same time, selects the standard clock signal SCK as the reading clock signal RCK.

When expanded images are to be formed, the signal $\overline{\text{REDUCE}}$ is "H", at which time the selector 454 selects the clock signal SCK as the writing clock signal WCK and selects the clock signal TCK as the reading clock signal RCK.

By accessing the RAMs 401 and 402 with the signals WCK and RCK having different pulse number per unit time image data signals D87-80 processed for changing magnification rates are generated.

Figure 8:
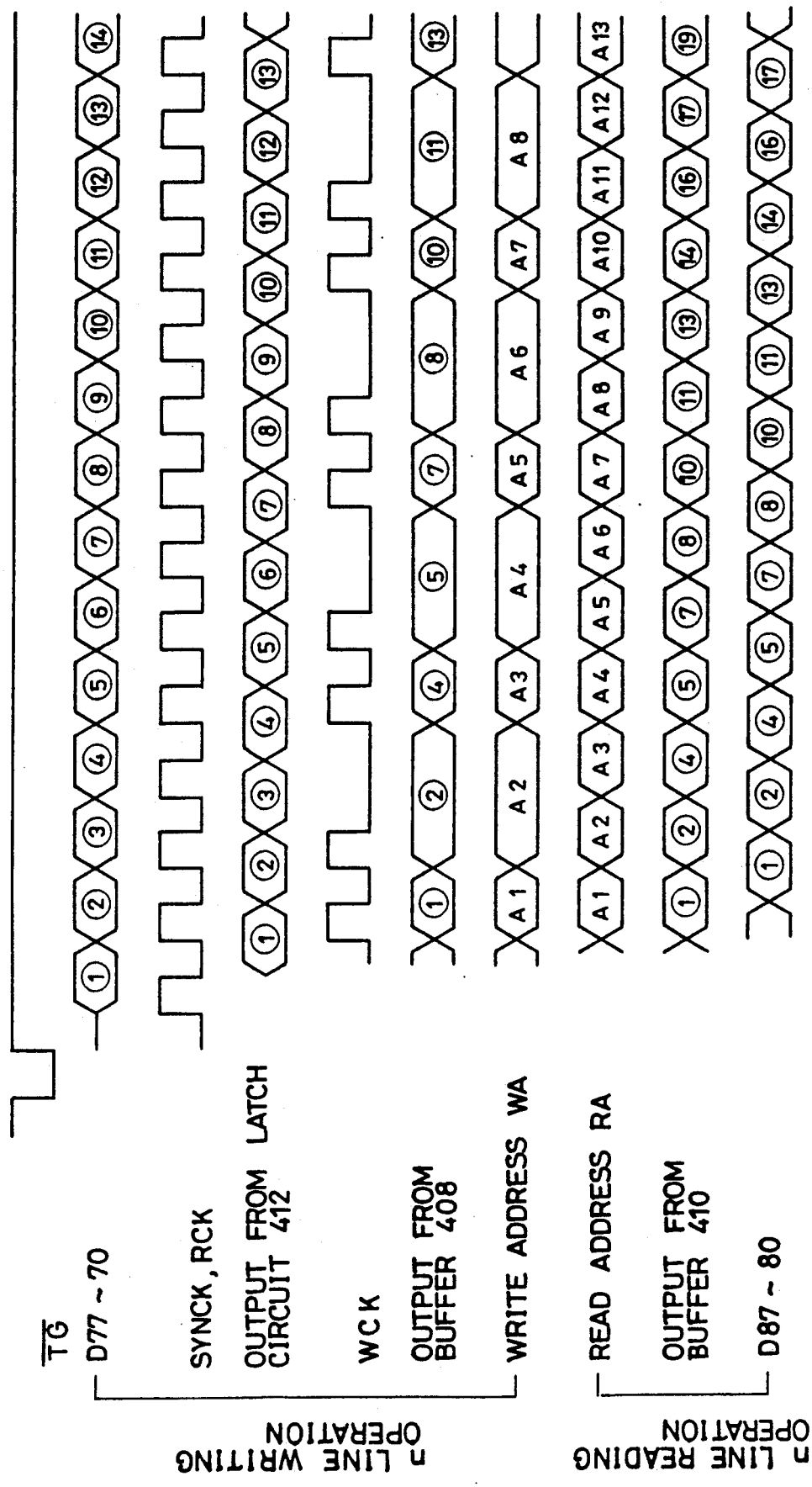
FIG. 8 is a time chart when reduced images are formed.
Figure 9:
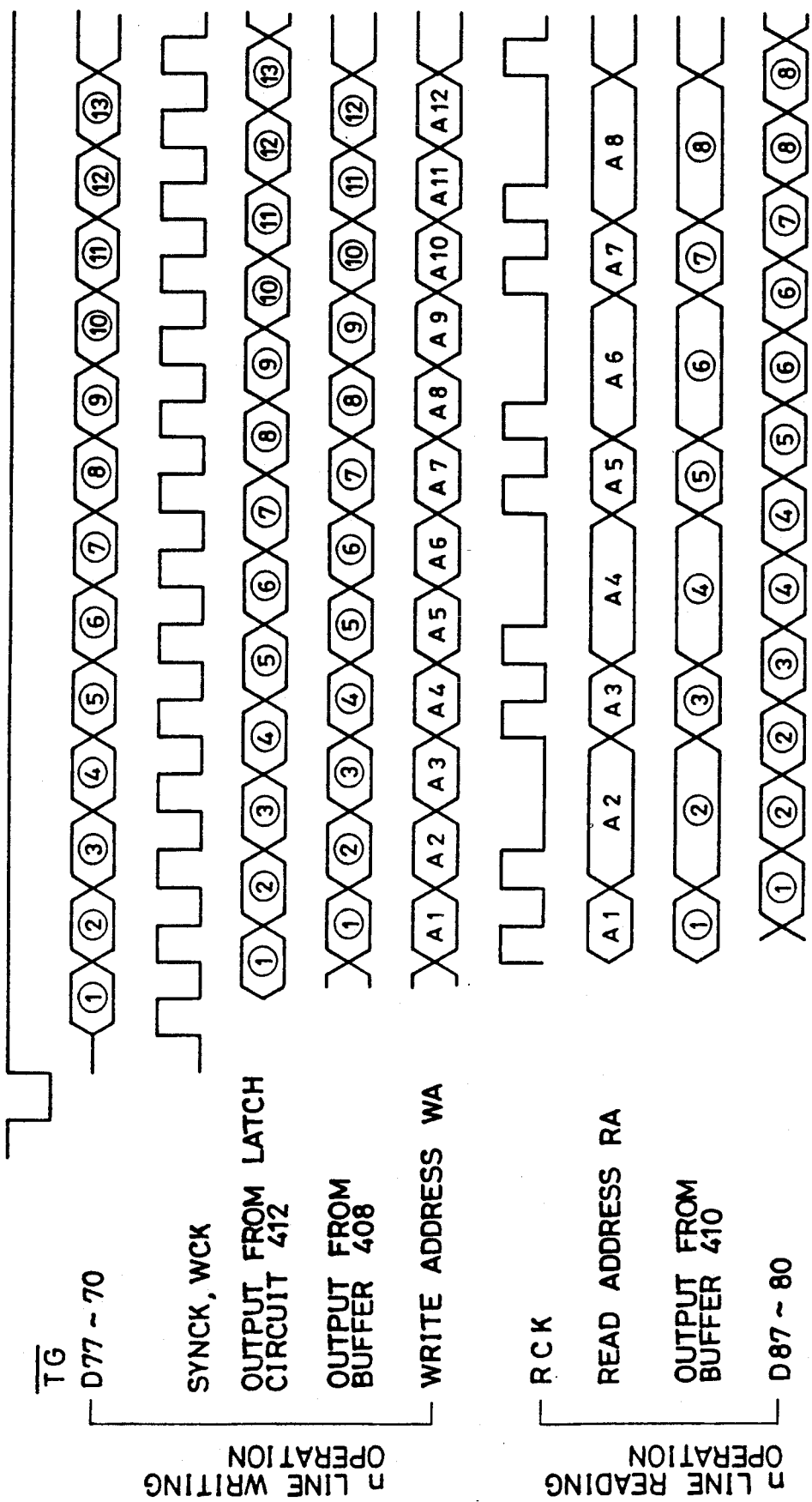
FIG. 9 is a time chart when expanded images are formed.

Referring to FIGS. 8 and 9, the time charts for reducing and expanding the images will be described.

In these figures, the writing operation and reading operation of the image data corresponding to one line are shown corresponding to the edge of one horizontal synchronizing enable signal $\overline{\text{TG}}$. However, actually, the writing operation and reading operation corresponding to one line is carried out alternately by every line period, as shown in FIG. 6.

Referring also to FIG. 5, when a reduced image with the magnification rate being ⅔ is to be formed, for example, the clock generating circuit 400 outputs a clock signal TCK as the writing clock signal WCK provided by skipping one pulse per every three pulses of the signal SYNCK, based on the MAG·DATA provided by the operation of the CPU 112.

When a vertical synchronization enabling signal $\overline{\text{VD}}$ for preventing transmission of image data signals D77 to 70 out of a valid image forming area becomes inactive, the latch circuit 412 becomes active, and latches the image data (①, ②, ③ ...) inputted as the image data signals D77 to 70 from the preceding stage, in accordance with the signal SYNCK.

When odd lines are to be processed, the signal $\overline{\text{ODD-LINE}}$ is "L" as shown in FIG. 6, and the output from the latch circuit 412 is transmitted to the RAM 401 through the buffer 408.

On this occasion, the writing address WA of the RAM 401 is incremented one address by one address from the start address A1 in accordance with the clock signal TCK having double frequency outputted as the signal WCK in the writing address counter 403. Since image data of 1 pixel are written at one address by the access synchronized with the address designation, reduced image data groups (①, ②, ④ ...) provided by skipping one pixel out of three pixels of the image data are stored in the RAM 401.

In reading, the RAM 401 is accessed in accordance with the clock signal SCK having the same pulse period as the signal SYNCK, and the image data signals D87 to 80 subjected to the reducing process are transmitted from the latch circuit 413 through the buffer 410.

Formation of expanded images will be described in the following, with the magnification rate being 3/2, for example. The clock generating circuit 400 generates the clock signal TCK by skipping 1 pulse at every 3 pulses of the signal SYNCK, as described above, which signal is outputted as the reading clock signal RCK.

Since the writing clock signal WCK is the same as the signal SYNCK, the image data (①, ②, ③ ...) of 1 line successively inputted are written into the RAM 401 in the order of input without dropping. However, the access of the RAM 401 in the reading operation is carried out in accordance with the clock signal TCK, so that the designation period of the even numbered addresses corresponds to the second period of the signal SYNCK. Consequently, expanded image data signals D87 to 80 in which the even numbered image data (②, ④ ...) are repeated are outputted from the latch circuit 413.

In this manner, by forming images based on the image data signals D87 to 80 generated with the timings of access in writing and reading operations made different in a set of RAMs 401 and 402, images having magnification rate changed in the main scanning direction can be formed.

The change of magnification rate of the images in the subscanning direction is carried out by changing the speed of scanning in the subscanning direction of the image reader unit 14. Namely, the scanning speed for changing the rate of magnification is set as V/a (mm/sec), when the scanning speed at the equal scale magnification is represented by V (mm/sec) and the rate of magnification change in the subscanning direction is represented by a.

Returning to FIG. 5, the address initial value in the reading address counter 404 is set based on load data LOAD·DATA from an adder circuit 461 to which movement data MOV·DATA are applied from the CPU112 and on a load signal LOAD provided from a repetition circuit 470.

By appropriately changing the address initial value, moved images can be formed in which the position of forming the image is shifted.

Figure 10:
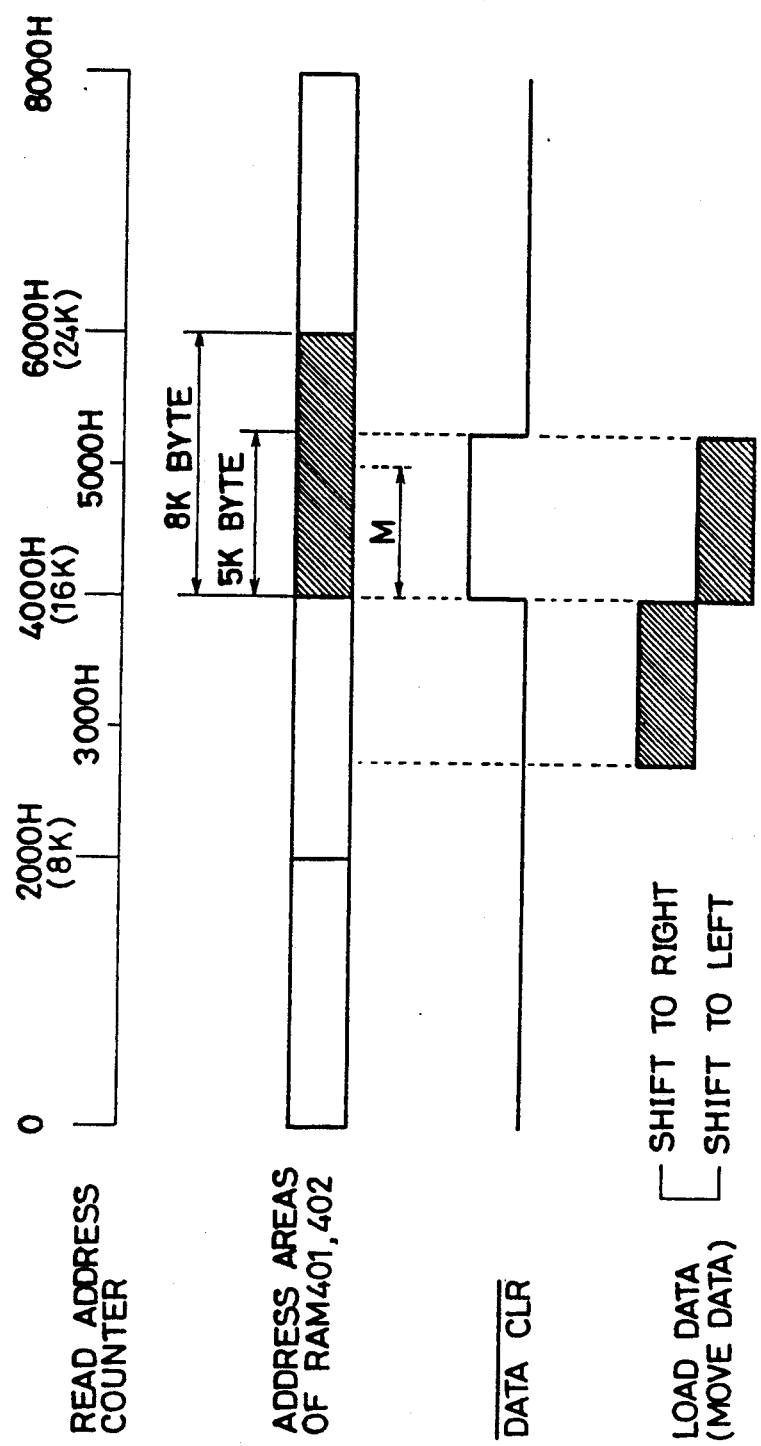
FIG. 10 shows address areas of a RAM in the image processing apparatus to which the present invention is applied.

As described above, the capacity of the RAM 401 or 402 is 8 Kbyte (8192×8 bits), and addresses from "0H" to "1FFFH" (13 bits) can be allotted thereto. Meanwhile, the reading address counter 404 is a 15 bit counter capable of generating addresses from "0H" to "7FFFH". Therefore, as shown in FIG. 10, the address areas of the RAMs 401 and 402 are allotted to "4000H" to "5FFFH". By increasing and decreasing the count initial value of the reading address counter 404 with "4000H" being the center by means of the load data LOAD·DATA, the reading position from the RAMs 401 and 402 can be shifted in left and right directions in the main scanning direction. The actual area in which the image data are written is determined dependent on the density of pixels and the size of the original. For example, when an original of A3 size with 16 pixels/mm is read, the amount of data of 1 line is about 5 Kbyte. In this embodiment, a data clear enable signal $\overline{\text{DATA·CLR}}$ is inputted from the reading address counter 404 to a clear terminal of the latch circuit 413 so that the data written in this range are outputted. The count initial value of the writing address counter 403 is "0", and in writing, writing of the image data to the RAM 401 or 402 is carried out successively from the address (physical address corresponding to the position of the image data on the original) 0.

For example, when the load data LOAD·DATA is "4000H", then reading is started from the address (logical address corresponding to the stored position of the image data in RAM.) "4000H", that is, the physical address "0", so that the image is formed at same position as the original image. When the load data LOAD·DATA is "3000H", then the increment of the reading address counter 404 is repeated, and the reading of the image data is started from the time when it becomes "4000H" allotted for the RAMs 401 and 402. Consequently, a moved image shifted in the right is formed.

The amount and the direction of shifting can be arbitrarily set by changing the movement data MOV·DATA. For example, when a reduced image is to be formed at the center of a sheet of copy paper, the CPU 112 carries out an operation to find the optimal value of the movement data MOV·DATA based on the rate of magnification and a signal detecting the copy paper size.

In the subscanning direction, the images can be moved by every 1/16 mm by setting earlier or later the timing to make the above mentioned vertical synchronization enable signal $\overline{\text{VD}}$ active by every line period.

The repetition circuit 470 is to form repeated images, which comprises a comparator 471 comparing the output from the reading address counter 404 with the repetition data REP·DATA, a gate circuit 472 to which the output from the comparator 471 and a repetition control enabling signal $\overline{\text{REP·ON}}$ are inputted, and a gate circuit 473 to which the output from the gate circuit 472 and the horizontal synchronization enable signal TG are inputted.

When the signal $\overline{\text{REP·ON}}$ is inactive (active low), namely, when repeated images are not formed, the output from the gate circuit 472 is always inactive, and the signal $\overline{\text{LOAD}}$ which is the output from the gate circuit 473 follows the signal TG. Therefore, in this case, the count initial value is set for every line as in the writing address counter 403.

When the signal $\overline{\text{REP·ON}}$ is active, the output from the comparator 471 becomes "L" (active) when the count value reaches the repetition data REP·DATA. Consequently, the signal $\overline{\text{LOAD}}$ becomes active and initialization for loading the load data LOAD·DATA to the reading address counter 404 is carried out. Even if the reading of 1 line is being carried out from the RAM 401 or the RAM 402, the reading address counter 404 is again incremented from the count initial value. In this manner, the image data stored in a specified address area of the RAM 401 or 402 is repeatedly read to generate repeated image data signals. The repeated images are useful when a large number of levels are to be formed, for example.

A variable initialization circuit 460 is to form inclined images which include the above mentioned adder 461 and the line counter 462. When an inclined image is to be formed, the count initial value of the reading address counter 404 is changed at prescribed period by the variable initialization circuit 460.

When an inclination enable signal $\overline{\text{ANGLE·OFF}}$ is "L", the line counter 462 counts up by the signal $\overline{\text{TG}}$, and the adder 461 outputs the load data LOAD·DATA which is provided by adding the movable data MOV·DATA to the output DOUT of the line counter 462. Therefore, the count initial value of the reading address counter 404 is inclined every line.

Consequently, the formed image becomes an inclined image in which 1 pixel is shifted to the left in every line. By skipping the signal $\overline{\text{TG}}$ to apply the same to the line counter 462, one pixel can be shifted at every plural lines, and by changing the count steps of the line counter 462, the angle of inclination can be controlled. By the down counting operation of the line counter 462 or by changing the adder 461 to a subtracter, the direction of inclination can be inverted.

The reading address counter 404 is capable of switching between up count operation and the down count operation by a mirror enable signal $\overline{\text{MIRROR}}$.

When the signal $\overline{\text{MIRROR}}$ is inactive, the reading address counter 404 carries out up count operation in accordance with the signal RCK starting from the count initial value set based on the load data LOAD·DATA, as described above. When the signal $\overline{\text{MIRROR}}$ is active, the operation is switched to the down count operation.

When the reading address counter 404 is switched to the counting down operation, the image data written in the RAM 401 or 402 are read in the reverse order of writing. For example, when "5000H" is set as the count initial value by the load data LOAD·DATA, the reading address counter 404 starts decrement from the logic address "5000H". In the RAM 401 or 402, reading of image data stored in the address range M from the physical address corresponding to the logic address "5000H" to the physical address "0" is carried out.

The image formed based on the image data signals D87 to 80 generated by the counting down operation of the reading address counter 404 is a so-called mirror image which is in line symmetry with the original image. The mirror image is used for forming a printing plate, for instance.

The above described image processing, namely, the change of magnification rate and processes for forming various edited images may be carried out independently or in combination. For example, an image reduced and inverted in the left and right directions can be repeatedly formed in the main scanning direction of one sheet of copy paper.

In accordance with the above described embodiment, the edited image data signals are generated by switching the counting operation or changing the count initial value of the address counter designating the address of the image memory. When a plurality of different image editing processes are to be carried out, complicated arithmetic operations become unnecessary, and the processes can be carried out at the same speed as in processing a single editing process.

In the above described embodiment, the clock generating circuit 400 generates the clock signal TCK by using the adder 451. The clock signal TCK for changing magnification rate may be generated from the standard clock signal SCK by dividing the standard clock signal SCK by using several stages of dividers. The magnification changing clock signal TCK provided by skipping the standard clock signal SCK is not limited to the pulse signals having different period but the signal includes frequency divided standard clock signal SCK.

In the above described embodiment, the writing address counter 403 has its count initial value fixed and only the counting up operation can be carried out by this counter. The count initial value and the counting operation only of the reading address counter 404 can be changed. On the contrary, the change of the count initial value and the switching of the counting operation may be carried out in the writing address counter 403, and the editing processes may be carried out in writing the image data to the RAM 401 or 402. Further, the count initial value may be changed in one address generating means and the counting operation may be switched in the other means to provide the same edited images as in the above described embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus having a plurality of image reading elements arranged one dimensionally, reading an original image by relatively moving these elements in a direction intersecting the direction of arrangement of the elements to output read image data to printer means, comprising:

first and second memory means each storing at least one line of image data in said direction of arrangement of the elements;

clock generating means for outputting a writing clock signal and a reading clock signal;

writing address generating means for generating a writing address for writing said image data to said first memory means or said second memory means in accordance with said writing clock signal;

reading address generating means for generating a reading address for reading said image data from said first memory means or said second memory means in accordance with said reading clock signal;

synchronized signal generating means for generating a signal synchronized with said image reading line by line;

controlling means for controlling said first memory means and said second memory means such that one of said first and second memory means carries out writing operation in accordance with said writing address while the other carries out reading operation in accordance with the reading address;

switching means for switching writing operation and reading operation of said first memory means and said second memory means in accordance with said synchronized signal;

changing means for making different the address generated from said writing address generating means from that generated from said reading address generating means, wherein said changing means includes means for changing at least one of a first initial address generated from said writing address generating means and a second initial address generated from said reading address generating means; and gate mean for receiving image data read out from said first and second memory means and for outputting only image data corresponding to an effective image region;

wherein said first memory means and said second memory means have a first capacity, said read address generating means has a second capacity, said second capacity being selected to be larger than said first capacity whereby address of said first memory means and said second memory means are allotted a part of address of said reading address generating means, and said changing means reads said image data from address other than the initial address of said first memory means and said second memory means allotted in said address generating means.

2. An image processing apparatus having a plurality of image reading elements arranged one dimensionally, reading an original image by relatively moving these elements in a direction intersecting the direction of arrangement of the elements to output read image data to printer means, comprising:

first and second memory means each storing at least one line of image data is said direction of arrangement of the elements;

a clock generating means for outputting a writing clock signal and a reading clock signal;

writing address generating means for generating a writing address for writing said image data to said first memory means or said second memory means in accordance with said writing clock signal;

reading address generating means for generating a reading address for reading said image data from said first memory means or said second memory means in accordance with said reading clock signal;

synchronized signal generating means for generating a signal synchronized with said image reading line by line;

controlling means for controlling said first memory means and said second memory means such that one of said first and second memory means carries out writing operation in accordance with said writing address while the other carries out reading operation in accordance with the reading address;

switching means for switching writing operation and reading operation of said first memory means and said second memory means in accordance with said synchronized signal;

changing means for making different the address generated from said writing address generating means from that generated from said reading address generating means, wherein said changing means includes initial address changing means for changing the initial address of at least one of said writing address generating means and said reading address generating means, wherein said change of the initial address is carried out by every prescribed line; and said initial address changing means includes line count means for receiving a signal indicative of an end of said one line and inclination signal designation formation of an inclined image for outputting an inclined image forming signal.

3. An image processing apparatus having a plurality of image reading elements arranged one dimensionally, reading an original image by relatively moving these elements in a direction intersecting the direction of arrangement of the elements to output read image data to printer means, comprising:

first and second memory means each storing at least one line of image data in said direction of arrangement of the elements;

clock generating means for outputting a writing clock signal and a reading clock signal;

writing address generating means for generating a writing address for writing said image data to said first memory means or said second memory means in accordance with said writing clock signal;

reading address generating means for generating a reading address for reading said image data from said first memory means or said second memory means in accordance with said reading clock signal;

synchronized signal generating means for generating a signal synchronized with said image reading line by line;

controlling means for controlling said first memory means and said second memory means such that one of said first and second memory means carries out writing operation in accordance with said writing address while the other carries out reading operation in accordance with the reading address;

switching means for switching writing operation and reading operation of said first memory means and said second memory means in accordance with said synchronized signal; and changing means for making different the address generated from said writing address generating means from that generated from said reading address generating means, wherein said changing means includes reading address setting means for resetting, during image data reading from one of said first memory means and said second memory means, a value of said reading address generated from said reading address generating means at an address value which has already been read; and said reading address reselling means includes:

a comparator comparing an output from said reading address generating means with a prescribed repetition data;

first gate means receiving an output from the comparator and a prescribed repetition image forming signal; and second gate means receiving an output from said first gate means and said synchronized signal.

* * * * *